United States Patent [19]

Tippmann et al.

[11] Patent Number: 5,201,364
[45] Date of Patent: Apr. 13, 1993

[54] APPARATUS FOR HEATING AND COOLING FOOD ARTICLES HAVING REMOVABLE PLATES WITH FLUID SEALED THEREIN

[76] Inventors: Vincent P. Tippmann, 8605 N. River Rd., New Haven, Ind. 46774; Joseph R. Tippmann, HRC-33, Box 8419, Rapid City, S. Dak. 57701

[21] Appl. No.: 583,207

[22] Filed: Sep. 17, 1990

[51] Int. Cl.$^5$ .................. F25B 29/00; F25B 13/00; A47B 31/02; A23L 1/00

[52] U.S. Cl. .................. 165/26; 165/11.1; 165/12; 165/48.1; 165/918; 165/919; 165/104.13; 165/104.26; 312/236; 126/19 R; 126/390; 219/386; 219/387; 99/470; 99/468; 99/448; 99/483

[58] Field of Search .............. 219/386, 387; 165/48.1, 165/12, 11.1, 918, 919, 104.26, 104.13, 26; 312/236; 126/19 R, 390; 99/470, 483, 468, 448

[56] References Cited

U.S. PATENT DOCUMENTS

| | | | |
|---|---|---|---|
| 3,791,372 | 2/1974 | Hatsopoulos et al. | 165/104.26 |
| 3,853,112 | 12/1974 | Lazaridis et al. | 165/104.26 |
| 3,948,244 | 4/1976 | Lazaridis et al. | 165/104.26 |
| 3,968,787 | 7/1976 | Basiulis | 165/104.26 |
| 4,118,756 | 10/1978 | Nelson et al. | 165/104.26 |
| 4,246,955 | 1/1981 | Skala | 165/104.26 |
| 5,086,693 | 2/1992 | Tippmann et al. | 165/919 |

FOREIGN PATENT DOCUMENTS 2611438  9/1988  France ................. 126/19 R

Primary Examiner—John K. Ford
Attorney, Agent, or Firm—Joseph J. Baker

[57] ABSTRACT

An apparatus is disclosed for heating or cooling food articles including a chamber containing a plurality of tubular, vertically, spaced-apart support means having a fluid inlet and outlet. A plurality of removably mounted hollow plates each having a plurality of spaced-apart tubular members having a fluid sealed therein connected to first and second plenums are positioned on the support means. Supply and return header means are connected to the inlet and outlet, respectively, of the support means and by conduit to a fluid reservoir and pump to circulate a fluid transfer means through each support means. Means for heating and cooling the fluid is also provided and control means for controlling operation of the heating and cooling means individually or in a predetermined sequence and at a preselected temperature is also included. During the heating mode the fluid inside the removable plates vaporizes and condenses.

8 Claims, 2 Drawing Sheets

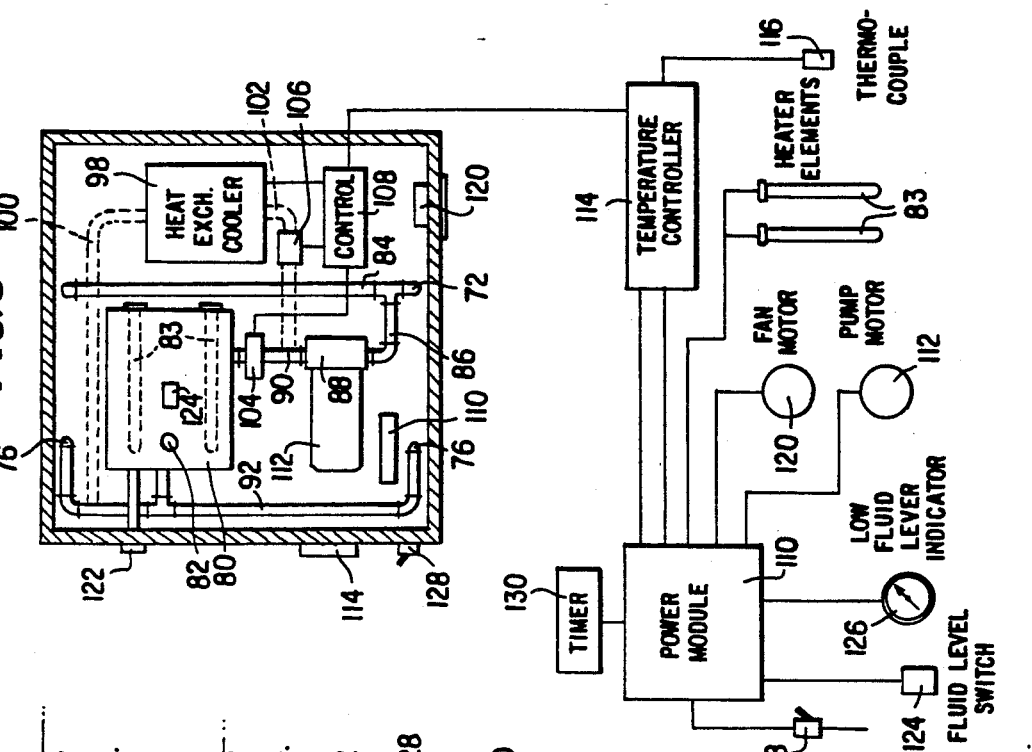
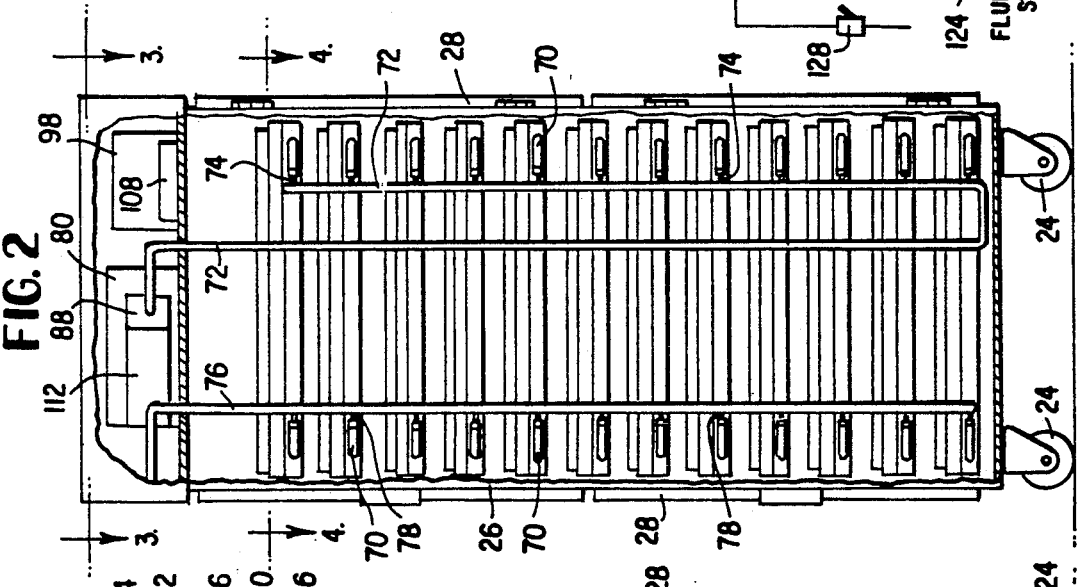
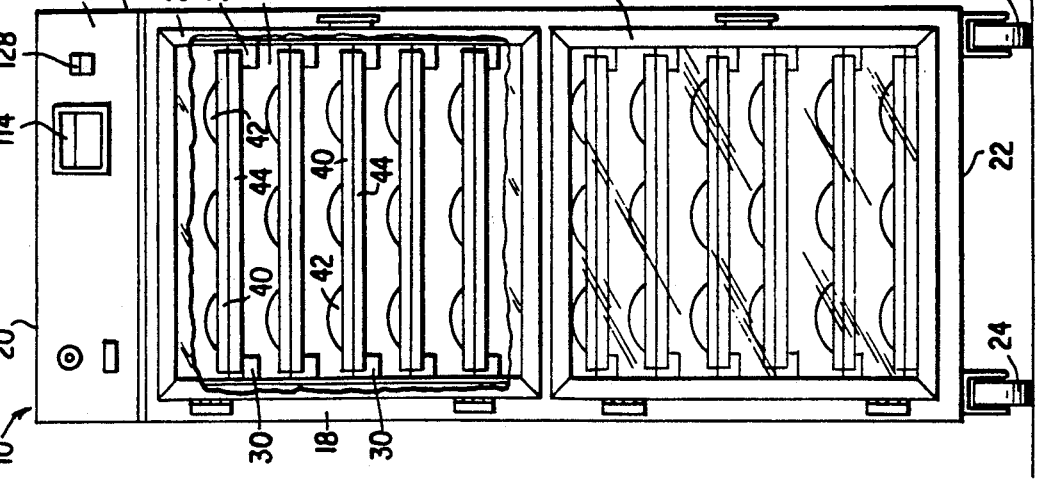

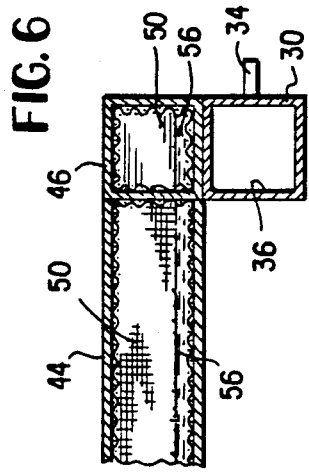
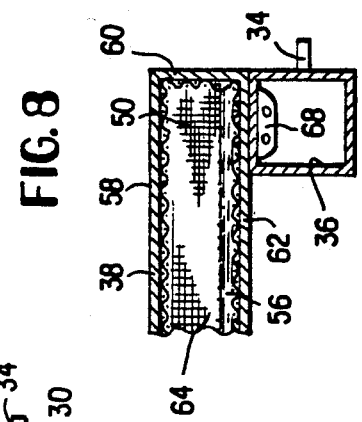
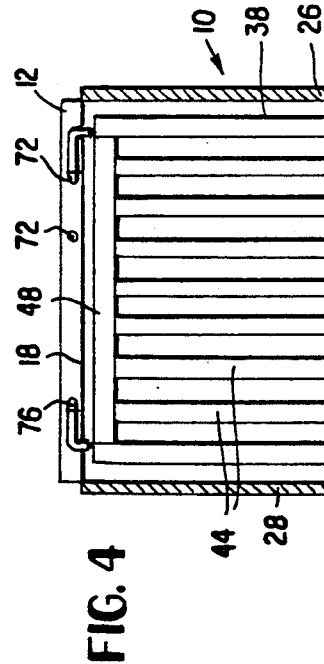
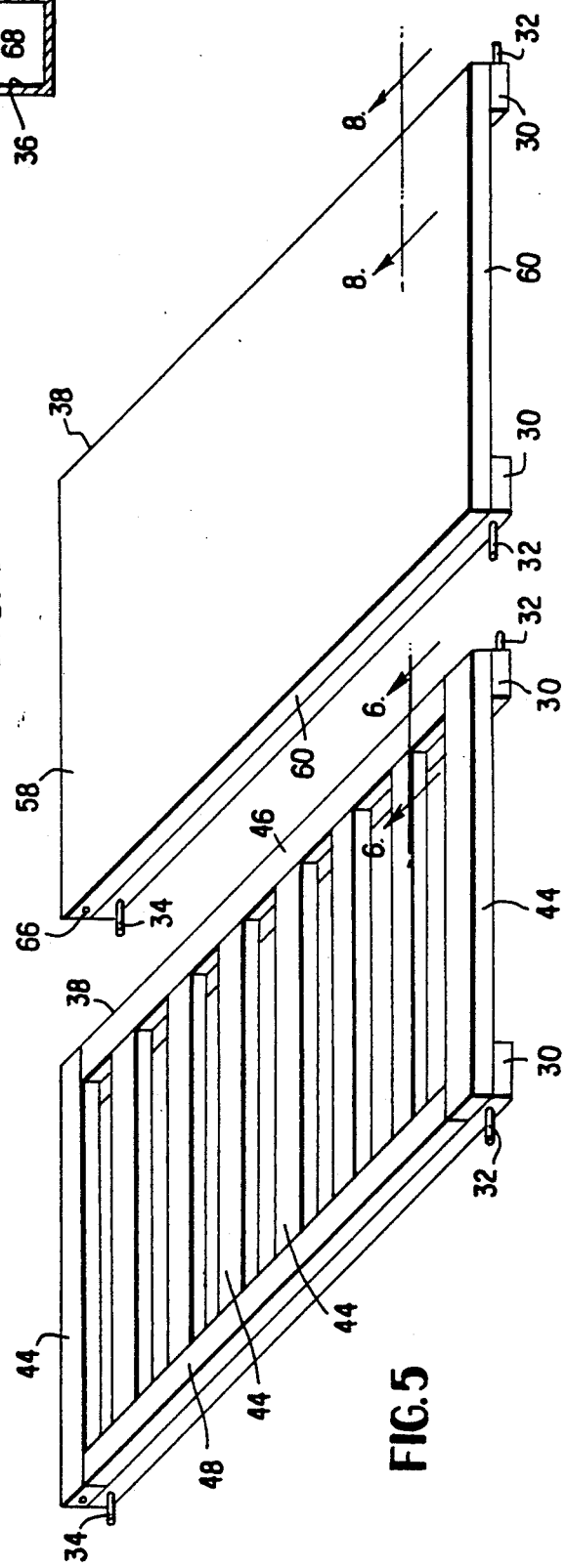

APPARATUS FOR HEATING AND COOLING FOOD ARTICLES HAVING REMOVABLE PLATES WITH FLUID SEALED THEREIN

BACKGROUND OF THE INVENTION

This inventions relates to an apparatus for transferring heat or cold to food articles and, more particularly, to a novel apparatus particularly adapted for holding previously cooked food articles quite near to a preferred temperature for prolonged time periods, and which can also be employed to initially cook food articles or to complete the cooking of food articles that have been previously partially cooked. In addition, the apparatus can also cool the previously cooked or partially cooked food articles or freeze them.

The novel method of cooking and holding food articles for which the present apparatus is utilized is disclosed in U.S. Pat. Nos. 4,210,675, 4,224,862 and 4,278,697 the contents of which are to be incorporated herein by reference in their entirety.

Briefly, the U.S. Department of Agriculture has long determined that there is considerable danger of spoilage and salmonella (food poisoning bacteria) development in food articles which are held for even short periods of time at temperatures ranging between 40° F. and 145° F. Prior art apparatus utilizing, for example, electrically heated air, steam, etc. have encountered problems in attempting to maintain warm food articles held in the apparatus at temperatures above 140° F. within a temperature range of +5° F. without also causing considerable undesired additional cooking or "overcooking" of them as pointed out in the aforementioned patents. The method comprises storing cooked meat or other food articles in a chamber having closure means intended to be repeatedly and frequently opened and closed, supporting the cooked food articles on support means located within the chamber, forcing a heated liquid heat-transferring medium through radiator means located adjacent to and on opposite sides of the support means, and maintaining the humidity within the chamber above that of the atmosphere outside of the chamber and the temperature above 140° F. and within a temperature range of +5° F. The apparatus disclosed in the aforementioned patents for practicing the aforestated method consisted basically of mounting a plurality of support means in vertical stacked relationship to each other. Each of the support means consisted of a plate to which is secured a serpentine coil for transferring the heated fluid. The coils of each support means are connected in series relationship to the pump and the sump containing the heated liquid. The aforedescribed support means it has been discovered is both inefficient and expensive to manufacture. The support means were not removable and the serial connection of all of the plates with their serpentine coils results in an unacceptably high pressure loss of fluid flowing through the coil and the necessity of using a larger pump. In addition, inefficient heat transfer and poor heat distribution resulted from the prior art design and coil connection. Further, placing the sump and pump on the bottom of the heating chamber inhibits air removal from the circulated fluid. The problems associated with the prior art apparatus are eliminated in the present invention by placing the sump and pump above the vertical stack of food support means.

The support means themselves are also novel in that they are removably held in vertically, spaced-apart relationship on mounting means secured to the side walls of the cabinet. The support means each consist of a plurality of spaced-apart tubular members each having one end thereof connected to a first plenum and the other end connected to a second plenum to form a fluid tight, hollow interior. The tubular members and plenums have a wick on the inside thereof consisting of a metallic screen material and a heat transfer medium in the form of water or volatile fluid partially fills the interior. The spacing between the tubular members permits visual inspection through layers of supports for the presence of food product left beneath the supports and their removability permits cleaning, maintenance and replacement.

The mounting means for the support means are also tubular in shape and each has a fluid inlet and outlet. The inlet and outlet of each mounting means is connected to a header system through which heated or cooled fluid is circulated by means of a pump. The plenums of the support means rest on the mounting means and heat is transferred therebetween by means of conduction.

It is therefore the primary object of the present invention to provide a superior apparatus for thawing, cooking, holding and cooling food articles.

It is another object of the present invention to provide a novel support for pans containing the food articles which is removable yet achieves even heat distribution by means of a novel wick system contained therein.

It is yet another object of the present invention to provide a novel header system for interconnecting a series of support mounting means which ensures an even supply of heating or cooling fluid.

Other objects and advantages of the present invention will become apparent and obvious from a study of the following description and accompanying drawings, which are merely illustrative of the present invention.

BRIEF DESCRIPTION OF THE DRAWINGS

FIG. 1 is a front elevational view with partial cutaway of the thawing, cooking, holding and cooling apparatus for food articles of the present invention;

FIG. 2 is a side elevational view with partial cutaway of the apparatus of FIG. 1;

FIG. 3 is a plan view taken along lines 3—3 of FIG. 2 and a block diagram of the electrical circuit of the apparatus of the present invention;

FIG. 4 is a cross-sectional view taken along the lines 4—4 of FIG. 2 of one of the pan supports of the present invention and its interconnection;

FIG. 5 is a perspective view of one embodiment of the pan supports of the present invention;

FIG. 6 is a cross-sectional view taken along lines 6—6 of FIG. 5;

FIG. 7 is a perspective view of another embodiment of the pan supports of the present invention; and FIG. 8 is a cross-sectional view taken along lines 8—8 of FIG. 7.

DETAILED DESCRIPTION OF THE INVENTION

Referring now to the drawings where like characters of reference indicate like elements of each of the several views, numeral 10 refers generally to the apparatus of the present invention for thawing, cooking, holding and cooling various types of food articles.

The apparatus 10 shown in FIGS. 1 and 2 comprises a cabinet member 12 having an upper chamber 14 containing electrical controls and parts of the closed-loop fluid transfer system and a lower chamber 16 for holding the food articles. The lower chamber 16 has a pair of vertically upstanding side walls 18, a top wall 20 and a bottom wall 22 to which is attached wheels 24. The front and back of the lower chamber 16 is open and closures are provided in the form of thermopane doors 26 and 28 on both the front and back of the lower chamber 16, respectively, to permit food articles to be loaded on one side and removed from the other.

Rectangular-shaped, tubular mounting members 30 are secured to the side walls 18 in vertically, spaced-apart relationship to each other. Each mounting member 30 has an inlet pipe 32 and outlet pipe 34 communicating with the interior 36 of the mounting members 30 to permit the circulation of fluid therethrough.

A plurality of removable supports 38 rest on and extend between the mounting members 30 at each level in the cabinet 12. The supports 38, which will be presently described, each hold a removable pan 40 containing the food articles 42, both the supports 38 and pans 40 can be loaded through, for example, the rear door 28 opening and after the desired cooking or holding time removed through the front door 26.

Referring to FIGS. 4, 5 and 6, the support 38 is shown consisting of spaced-apart tubular members 44. Each of the tubular members 44 has one end thereof connected in fluid tight relationship to a first plenum 46 and the other end thereof connected to a second plenum 48. Preferably the tubular members 44 and plenums 46, 48 are rectangular in shape and present a flat surface to the pans 40 as well as the mounting members 30 to thereby ensure maximum and even heat conduction therebetween. A wick 50 in the form of fine mesh metallic screen material of, for example, copper is provided adjacent the interior surface 52 of each tubular member 44 as well as the interior surface of each plenum 46 and 48. The heat transfer fluid 56 contained in the sealed supports 38 can be water or a low pressure refrigerant and the wick material 50 ensures even and complete distribution of the heat from the mounting members 30 through the first and second plenums 46 and 48 and the tubular members 44 by capillary action.

Referring to FIGS. 7 and 8, the support 38 is shown as having a continuous upper surface in the form of a plate member 58 having sidewalls 60 depending from the peripheral edge thereof. The lower edge of the sidewalls 60 are secured to the peripheral edge of a lower plate members 62 forming an enclosed water tight chamber 64 lined with wick material 50. A drain and filler plug 66 is also provided communicating with the interior 64 of the plate 38. Electrical heating elements 68 can also be provided along the interior 36 of the mounting members 30 adjacent to the surface on which the support 38 rests to provide heat and thereby eliminate the fluid transfer system with its associated piping, pumps, etc.

Each inlet 34 of each mounting member 30 is connected by flexible tubing 70, for example, to a header supply pipe 72 having a plurality of spaced-apart take-off pipes 74. Similarly, each outlet 32 from each mounting member 30 is connected by flexible tubing 70, for example, to a header return pipe 76 also having a plurality of spaced apart take off pipes 78. It being understood of course that other methods such as pipe couplings and the like could be used in place of flexible tubing 70.

Referring now to FIG. 3, the upper chamber 14 contains a reservoir 80 having a fill cap 82 for holding a supply of transfer fluid 81 which can be heated by electrical heating elements 83 extending into the reservoir 80. The transfer fluid 81 is normally plain water or a mixture of water and ethylene gychol. The transfer fluid 81 can also be heated by a gas burner (not shown) or steam if desired. The header supply pipe 72 is connected to supply line 84 which in turn is connected to the discharge outlet 86 of a pump 88. The inlet side 90 of the pump 88 is also connected to the reservoir 80 and the header return pipe 76 is connected by return line 92 also to the reservoir 80 to thereby complete a closed loop fluid transfer system wherein none of the transfer fluid 56 is exposed either within the upper or lower chambers 14 and 16.

Thus, the pump 88 withdraws heated fluid from the reservoir 80 through pipes 86, 90 and forces it into mounting member 30 via supply line 84, header supply pipe 72, header return pipe 76, return line 92 and back to reservoir 80. The supply line 84 is connected to header supply pipe 72 at the lower end thereof and the return line 92 is connected to header return pipe 76 at the upper end thereof to thereby permit trapped air in the system to eventually make its way back to reservoir 80 and discharged therefrom. A drain plug (not shown) is also provided at the bottom of the headers 72 and 76.

In addition, a heat exchanger-cooler 98 can also be provided connected to return line 92 by conduit 100 and to the inlet side 90 of pump 88 by conduit 102. The heat exchanger-cooler 98 can be employed to cool the mounting members 30 which in turn cool the supports 38 rapidly by closing valve 104 and permitting all of the transfer fluid 81 to pass through the heat exchanger 98 where it is cooled or, if it is desired, to gradually either cool the heated transfer fluid 81 or heat the already cooled transfer fluid, valves 104 and 106 can be partially opened to permit a mix of heated and cooled fluid to enter the pump 88 by means of control 108.

An electrical control circuit is shown in FIG. 3 in block diagram form and includes a module 110 for controlling the electrical power to the heating elements 83, the motor 112 of the pump 88 in response to temperature set on temperature controller 114 and the temperature sensed by thermocouple 116 of the transfer fluid 81 in reservoir 80. The temperature controller 114 also controls controller 108 which in turn energizes heat exchanger-cooler 98 and valves 104 nd 106 depending on the extent of cooling of the transfer fluid 81 desired. An auto-transformer (not shown) is also provided to reduce the line voltage, usually 220 volts, to 110 volts to energize the pump motor 88 and a small fan 120 is installed on the wall of the upper chamber 14 to circulate cooling air therethrough. In order to visually tell the level of the transfer fluid 81 in the reservoir 80, a cite-glass 122 is provided extending into the reservoir 80 and a fluid level float-type switch 124 is also positioned in the reservoir to energize a warning light in the form of a low fluid level indicator 126 if the transfer fluid 81 falls below a predetermined level to thereby prevent damage to the heater elements 83. A switch 128 connects the power module 110 to a source of electrical current. The power module 110, temperature controller 114 and thermocouple 116 can also be adapted to control energization of heating elements 68 rather than heater elements 83 and other aforedescribed parts of the fluid transfer system.

In operation, the temperature controller 114 is set at a preferred temperature which is the temperature the operator wants to achieve and/or maintain at the center of the food article 42. When the apparatus 10 is employed to initially cook food articles or to complete the cooking of food articles that have been previously partially cooked, this preferred temperature is the so-called "doneness temperature" of the food article 42, e.g. for chicken parts this "doneness temperature" is 186° F.; for beef parts, this "doneness temperature" is 186° F. However, it should be understood that it is often preferred to hold food articles which have been previously fully cooked at a "holding temperature" that is lower than their "doneness temperature". With chicken parts, for example, the "holding temperature" is 150° F. or 36° F. below the "doneness temperature" of 186° F. Thus, after the temperature controller 114 is set at the desired preferred temperature, the heaters 83 are energized and the transfer fluid, 81 is heated and circulated by pump 88 through the mounting members 30 into the supports 38 and food article 42 on pans 40. A timer 130 is also provided to cause the power module 110 to reduce the preferred temperature of the transfer fluid 81 to a lower amount after the food article 42 has reached the "doneness temperature" and it is then desired to "hold" the article at a lower temperature for a period of time. The timer 130 can also be employed to energize the heat exchanger/cooler 98 to gradually cool the held article to prevent its spoilage. In addition, the timer 130 may be used to energize the power module 110 in the morning to begin warming the transfer fluid 81 to thaw frozen food articles 42, bring them up to "doneness temperature" and after a period of time reduce them to "holding temperature" for serving or further processing in a browning oven.

Applicants have thus described in detail their apparatus for heating and cooling food articles which employs the novel removable pan support concept and novel header system for connecting the plurality of mounting members in a closed loop, fluid transfer system.

It is apparent that many modifications and variations of this invention as hereinbefore set forth may be made without departing from the spirit and scope thereof. The specific embodiments described are given by way of example only and the invention is limited only by the terms of the appended claims.

We claim:

1. An apparatus for transferring heat to food articles contained within a chamber comprising:
   a) a chamber having at least two vertically upstanding spaced-apart side walls and adjacent top and bottom walls;
   b) a plurality of vertically spaced-apart mounting means adjacent each of said side walls, each of said mounting means being tubular in shape and having a fluid inlet and outlet thereon;
   c) a plurality of vertically spaced-apart, removably mounted support means on said mounting means, said support means having an amount of heat absorbing fluid medium sealed therein;
   d) supply header means connecting said inlets of each of said mounting means and return header means connecting said outlets of each of said mounting means; and
   d) means for circulating a heated transfer fluid through said supply and return header means and said support means.

2. Apparatus as set forth in claim 1 wherein each of said support means includes a plurality of spaced-apart tubular members, each tubular member having one end thereof connected to a first plenum and the other end thereof connected to a second plenum, the interiors of each of said tubular members being in communication with the interior of said first and second plenums, said first and second plenums being in heat conductive relationship with said mounting means.

3. Apparatus as set forth in claim 2 further comprising wick means located within said first and second tubular members and said first and second plenums.

4. Apparatus as set forth in claim 3 wherein said wick means consists of a metallic screen material.

5. Apparatus as set forth in claim 1 wherein said heat absorbing fluid medium is a volatile fluid.

6. Apparatus as set forth in claim 1 wherein said circulating means comprises:
   a) reservoir means for holding a quantity of transfer fluid;
   b) fluid pump means;
   c) conduit means fluid-connecting said reservoir, said supply and return header means and said pump means to form a closed-loop fluid transfer means;
   d) means for heating said fluid in said reservoir means; and
   e) control means connected to said heating means for controlling the desired temperature to which the fluid is to be heated and maintained by said heating means.

7. Apparatus as set forth in claim wherein said support means consists of two spaced-apart flat surface members having the peripheral edge portions thereof in fluid tight sealing engagement with each other and defining a hollow interior containing said heat transfer fluid.

8. Apparatus as set forth in claim 1 further comprising:
   a) heating exchange means connected to said supply and return header means for cooling said transfer fluid; and
   b) control means for controlling the passage of said transfer fluid through said heat exchange means.

* * * * *